United States Patent
Dreyer et al.

[19]

[11] Patent Number: 6,085,258
[45] Date of Patent: Jul. 4, 2000

[54] STATE MACHINE FOR SELECTIVELY PERFORMING AN OPERATION ON A SINGLE OR A PLURALITY OF REGISTERS DEPENDING UPON THE REGISTER ADDRESS SPECIFIED IN A PACKET

[75] Inventors: Stephen F. Dreyer, Los Altos Hills; Rong-Hui Hu, Union City, both of Calif.

[73] Assignee: LSI Logic Corporation, Milpitas, Calif.

[21] Appl. No.: 09/100,270

[22] Filed: Jun. 19, 1998

Related U.S. Application Data

[63] Continuation of application No. 08/695,793, Aug. 12, 1996, Pat. No. 5,790,888.

[51] Int. Cl.$^7$ .............................. G06F 13/00; G06F 9/00; G06F 15/00
[52] U.S. Cl. ................... 710/5; 710/14; 710/36; 710/52; 711/5; 712/128; 370/390
[58] Field of Search .................... 395/825, 829, 395/834, 856, 872, 405, 494, 800.28; 710/5, 9, 14, 36, 52; 711/5, 167; 712/28; 365/189.02; 370/390

[56] References Cited

U.S. PATENT DOCUMENTS 5,966,731  10/1999  Barth et al. .............................. 711/167
6,021,477   2/2000  Mann ....................................... 711/167

*Primary Examiner*—Thomas C. Lee
*Assistant Examiner*—Thah Nguyen

[57] ABSTRACT

A multiple-register-access-capable device includes a serial port coupled to a plurality of registers. The multiple-register-access-capable device is controlled by a state machine. Information in one of the registers identifies whether the device is in a single-register or multiple-register mode. The state machine which controls the device operates in a single-register mode if the bit is disabled and operates in a multiple-register mode if the bit is enabled. In single-register mode, the device operates in a manner known in the prior art whereby a single register is identified for reading or writing and data is then either written into the register or read out from the register in response to a write or read request. In multiple register mode, data is written into or read out from all registers in a selected group of registers in the device in response to the write or read request. When the device of the present invention is in multiple-register access mode, a read or write operation addressed to a selected register is interpreted as a request to read or write from all registers in a defined group of registers and the state machine directs the operation of the device to accomplish a read from or write to all of the registers in the group. When the device is in single-register mode, operations addressed to the selected register cause normal read or write operation to be executed with respect to that register.

6 Claims, 4 Drawing Sheets

| | ST | OP | PHYAD | REGAD | TA | DATA |
|---|---|---|---|---|---|---|
| READ | 01 | 10 | A4–A0 | R4–R0 | Z0 | D15–D0 |
| WRITE | 01 | 01 | A4–A0 | R4–R0 | 10 | D15–D0 |

A = DEVICE ADDRESS
R = REGISTER ADDRESS
Dx = DATA IN x POSITION

|  | ST | OP | PHYAD | REGAD | TA | DATA |
|---|---|---|---|---|---|---|
| READ | 01 | 10 | A4–A0 | R4–R0 | Z0 | D511–D0 |
| WRITE | 01 | 01 | A4–A0 | R4–R0 | 10 | D511–D0 |

A = DEVICE ADDRESS
R = REGISTER ADDRESS
D = DATA

STATE MACHINE FOR SELECTIVELY PERFORMING AN OPERATION ON A SINGLE OR A PLURALITY OF REGISTERS DEPENDING UPON THE REGISTER ADDRESS SPECIFIED IN A PACKET

CROSS REFERENCE TO A RELATED APPLICATION

This application is a continuation of U.S. patent application Ser. No. 08/695,793, filed on Aug. 12, 1996, Entitled "STATE MACHINE FOR SELECTIVELY PERFORMING AN OPERATION ON A SINGLE OR A PLURALITY OF REGISTERS DEPENDING UPON THE REGISTER ADDRESS SPECIFIED IN A PACKET" by inventors Stephen F. Dreyer and Rong-Hui Hu, and issued as U.S. Pat. No. 5,790,888 on Aug. 4, 1998.

BACKGROUND OF THE INVENTION

1. Field of the Invention

This invention relates to the field of data communications. More specifically, it relates to the field of serial port access to registers and to the field of serial port access to multiple registers.

2. The Prior Art

Numerous applications take advantage of register-based serial ports. A device may contain a plurality of registers which communicate with a serial port from which data is written into the registers and to which data is read from the registers. A system may include a plurality of such devices each having its own plurality of registers.

An example of a system in the prior art to which the present invention is relevant is the IEEE Standard 802.3u, clause 22. IEEE standard 802.3u defines the logical, electrical, and mechanical characteristics for the Reconciliation sublayer and Media Independent Interface (MII) between CSMA/CD media access controllers and various physical layer devices.

The physical layer devices in this system may have a management port which is a register-based serial port. During system operation, data may be written to and read from individual ones of the registers in the physical devices.

Communication in such a system is packet based. A packet of information asserted on the serial port contains a read/write operation identifier, an address of the physical device containing the register of interest, an address of the register of interest within that device, and, if the operation is a write operation, the data to be written into the register. As will be appreciated by those of ordinary skill in the art, the packet also contains bits used to synchronize the receipt of the information contained therein.

While these systems have performed satisfactorily in the prior art, they are inefficient when read or write operations to multiple registers are to be performed. In order to read or write from or to multiple registers in the same physical device, individual packets must be asserted on the bus to which the serial port is connected. This necessarily consumes valuable bandwidth.

OBJECTS AND ADVANTAGES OF THE INVENTION

Accordingly, it is an object of the present invention to provide a method for accessing multiple registers over a serial port in a register-based serial port device in a single operation.

It is a still further object of this invention to provide a multiple-register-access-capable register-based serial port device.

These and many other objects and advantages of the present invention will become apparent to those of ordinary skill in the art from a consideration of the drawings and ensuing description of the invention.

SUMMARY OF THE INVENTION

In accordance with the present invention, apparatus and methods for multiple register access of a register-based serial port device are disclosed.

A multiple-register-access-capable device according to the present invention includes a plurality of registers and a serial port with which the plurality of registers communicate. Communications packets arriving on the serial port include information identifying the device and register within the device for which they are destined. Packets either contain data to be written into the destination register or contain data that are to be written out to the serial port.

Since not all hardware and software will support multiple register access, the multiple-register-access-capable device of the present invention is equipped with the capability to turn the multiple register access mode on and off. This allows the multiple-register-access-capable device of the present invention to be used in systems which do not support multiple register access. The multiple register access mode is turned on before multiple register access is attempted.

The multiple-register-access-capable device of the present invention includes a serial port coupled to a plurality of registers. The multiple-register-access-capable device of the present invention is controlled by a state machine or some equivalent logic block. Information written into the multiple-register-access-capable device of the present invention (usually a single bit in one of the registers, a pin on the integrated circuit, etc.) identifies whether the multiple-register-access-capable device of the present invention is in a single-register or multiple-register mode. The state machine which controls the device operates in a single-register mode if the bit is disabled and operates in a multiple-register mode if the bit is enabled.

In single-register mode, the multiple-register-access-capable device of the present invention operates in a manner known in the prior art whereby a single register is identified for reading or writing and data are then either written into the register or read out from the register in response to a write or read request. In multiple register mode, data are written into or read out from all registers or from a group of registers in the device in response to the write or read request.

When the multiple-register-access-capable device of the present invention is in multiple-register access mode, a read or write operation addressed to a selected register is interpreted as a request to read or write from all registers in a defined group of registers and the state machine directs the operation of the device to accomplish a read from or write to all of the registers in the group. When the multiple-register-access-capable device of the present invention is in single-register mode, operations addressed to the selected register cause normal read or write operation to be executed with respect to that register.

According to a method of the present invention, a multiple-register-access-capable device of the present invention may be in single-register access mode or in multiple-register access mode. In single-register access mode, the device is compatible with prior-art devices and operates in the manner known in the prior art for single-register read and write operations. According to a presently preferred embodiment of the present invention, placing the multiple-register-access-capable device of the present invention into single-register or multiple-register mode may be accomplished by setting or resetting a multiple-register-access bit which occupies a selected bit position in one of the registers in the device.

When in single-register access mode, the state machine controlling the operation of the device is caused to operate the device in the manner well known in the prior art. When in multiple-register access mode, the state machine controlling the operation of the device is caused to operate the device in the manner well known in the prior art unless a selected register is addressed for a read or write operation. When the selected register is addressed, the state machine causes the device to perform the requested read or write operation on a plurality of registers, usually all of the registers in the device.

Thus, in multiple-register mode, a write frame asserted at the serial port of the device addressed to the selected register will have a data field comprising all of the data to be written into all of the plurality of registers. Likewise, a read frame asserted at the serial port of the device addressed to the selected register will cause all of the plurality of registers to drive their contents onto the serial port.

In a communications system according to the present invention, one or more driving devices are connected to a serial bus. One or more multiple-register-access-capable devices disclosed herein are also connected to the serial bus.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

An example of an environment in which the present invention is useful is the Fast Ethernet communications environment, although persons of ordinary skill in the art will readily understand from this disclosure that the present invention may be used in other register-based serial port applications.

IEEE Standard 802.3u, clause 22, defines the logical, electrical, and mechanical characteristics for the Reconciliation sublayer and Media Independent Interface between CSMA/CD media access controllers and various physical layer devices. The purpose of the MII is to provide a simple, inexpensive, and easily implemented interconnection between the Media Access Control sublayer and Physical layer devices, and between Physical layer devices and Station Management entities.

There are actually two interfaces defined in the IEEE Standard 802.3u, clause 22. The MI and the MII. The MII is a nibble interface between the controller and a Physical Device. The MI is a serial management interface between a physical device and some management station.

Figures 1, 2:
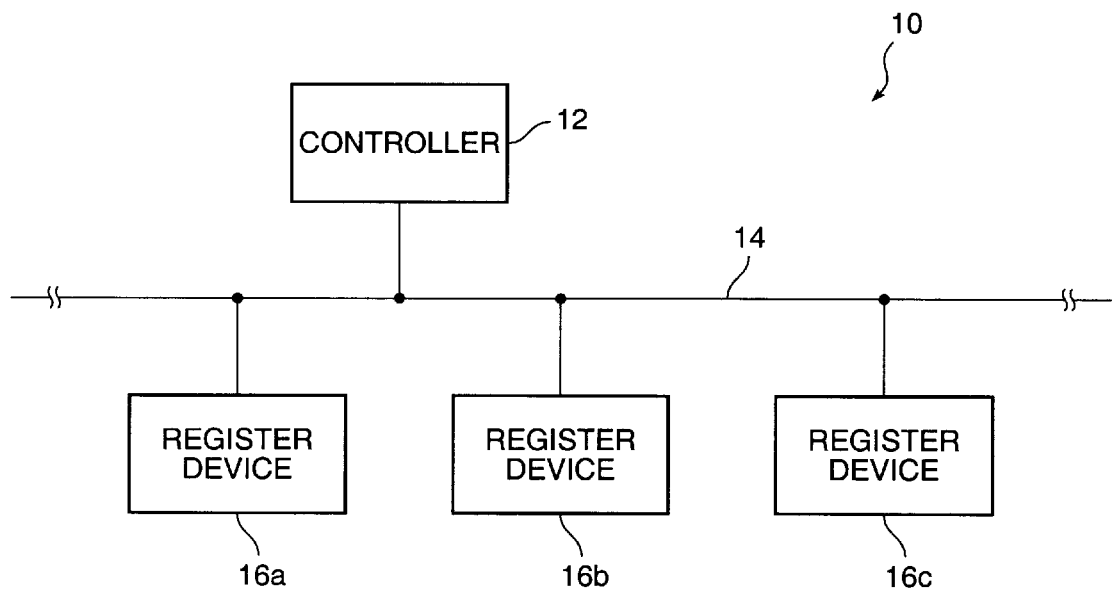
FIG. 1 is a block diagram of a system including a plurality of register-based serial port devices connected to a serial port.
FIG. 2 is a bit map of typical read and write packets addressed to a device such as one of the ones shown in FIG. 1.

Turning now to FIG. 1, a block diagram shows a generic representation of a relevant portion of a prior-art communications arrangement 10 (such as one which operates according to IEEE standard 802.3u) including a controller 12 communicating with a serial link 14. Controller 12 may be any of a number of known devices such as ethernet controllers, microcontrollers, Application Specific Integrated Circuits (ASICs), or any other logic device for system management. A plurality of register-based serial port devices 16a through 16c (referred to as "Physical Devices" in the IEEE protocol) are also shown in communication with the bus 14. FIG. 1 illustrates a typical environment in which the present invention can be employed.

The serial link 14 that is connected between controller 12 and serial port devices 16a through 16c provides the communications link between those devices. The IEEE standard referenced above provides a simple, two wire, serial interface to connect a management entity and a managed Physical Device like the register-based serial port devices of FIG. 1 for purposes of controlling the Physical Devices and gathering status from the Physical Devices. This management interface is the MI serial link referred to above.

The two signals that make up the Management Interface are the management data clock (MDC) and the management data input/output (MDIO). These signals are carried over the MI serial link 14 on a MDC link and a MDIO link respectively as is known in the art. The MDC signal is the clock signal for transfer of information on the MDIO signal. MDC is always driven by the controller 12.

MDIO is a bidirectional signal between the controllers and the physical devices. It is used to transfer control information and status between these devices. Control information is driven by the controllers synchronously with respect to MDC and is sampled synchronously by the physical devices. Status information is driven by the Physical Devices synchronously with respect to MDC and is sampled synchronously by the Controllers.

In addition to the MDC and MDIO signals, the Media Interface includes a frame format and a protocol specification for exchanging management frames and a register set which can be read and written using these frames. The register definition specifies a basic register set predefined by IEEE 802.3u, clause 22, with an extension mechanism to allow registers to be defined uniquely for each physical device.

All of the frames transmitted on the serial link by prior-art systems using the IEEE protocol have the frame structure shown in FIG. 2. The numerical entries in FIG. 2 are in binary notation. The order of bit transmission is from left to right. The frame for this protocol is specific to the application in which it is used and is discussed here for illustrative purposes only to permit ease of understanding of the present invention, which is of course not limited to devices using this protocol.

Referring now to each of the fields individually in FIG. 2, the first field of the frame is a start-of-frame (ST) field. the start of frame (ST) field for every frame is a bit pattern comprising a "01". Idle time between packets is defined by ≧32 consecutive "one" bits, so the "zero" bit tells the device that a frame is starting.

The next field in the frame is a two-bit operation code (OP) field. The OP field defines the nature of the operation to be performed, i.e., a read operation or a write operation. The OP field for a read transaction is "10", while the OP field for a write transaction is "01".

The next field in the frame is a five-bit Physical Device Address (PHYAD) field, allowing addressing of thirty two unique Physical devices. The first PHYAD bit transmitted and received is the most significant bit of the address. A Physical Device which is connected to the Controller via the mechanical interface defined in the IEEE standard always responds to transactions addressed to PHYAD zero "00000". The other Physical Devices in the system are assigned other PHYAD addresses from "00001" up to "11111". A controller which is attached to multiple Physical Device entities must have à priori knowledge of the appropriate PHYAD for each Physical Device entity.

The next five-bit field in the frame is the Register Address (REGAD) field, allowing thirty two individual registers to be addressed within any Physical Device. The first REGAD bit transmitted and received is the most significant bit of the address. The register accessed at REGAD zero "00000" is the control register as defined by the IEEE standard and the register accessed at REGAD one "00001" is the status register as defined by the IEEE standard.

The turnaround time (TA) is a two bit time spacing interposed between the REGAD field and the Data field of a management frame to avoid contention between the write and read bits during the transition from write to read. The turnaround time allows the bi-directional bus to which the data ports on the individual registers are connected to be configured to accept data from the selected register in the event that the frame was a request to read the status of the register instead of a request to write data to the register. For a read transaction, both the controller and the Physical Device remain in a high impedance state for the first bit time of the TA as indicated by the letter "Z". The Physical Device drives a zero bit during the second bit time of the TA of a read transaction. During a write transaction, the Controller drives a one bit for the first bit time of the TA and a zero bit for the second bit time of the TA.

The last field in the frame is the data field (DATA). The data field is always sixteen bits in the prior art, as indicated by data bits D0 through D15, because the length of each register in a Physical Device used in the aforementioned IEEE standard is sixteen bits. The first data bit transmitted and received is bit fifteen of the register being addressed.

According to the IEEE protocol, and at the beginning of each transaction, the Controller sends a sequence of at least thirty two contiguous logic one bits on MDIO with the same number of corresponding cycles on MDC to provide the Physical Device with a pattern that it can use to establish an idle state. The Physical Device observes a sequence of at least thirty two contiguous one bits on MDIO with the same number of corresponding cycles on MDC before it responds to any transaction.

Therefore, a minimum of sixty four clock cycles are necessary in order to access only one register in a Physical Device. The total of sixty four cycles is the sum of the thirty two cycles to set the idle state for a Physical Device and a Controller and the thirty two cycles for the MI frame of FIG. 2. Consequently, if the Controller has to access all thirty two of the registers of a Physical Device, persons skilled in the art will appreciate that it would take a total of 2048 clock cycles (32×64=2048) This is a lot of overhead in terms of software and clock time and is not a very efficient use of the available bandwidth.

The multiple-register-access-capable device of the present invention responds to the problem presented by the prior art devices by adding a multiple register access mode. In the multiple register access mode, the Controller is allowed to access all of the registers in a Physical Device at one time. This is accomplished through the use of a multiple register access method employing a Controller and a Physical Device which have been enhanced in accordance with the present invention to perform the method.

The multiple-register access mode of the device of the present invention may be implemented in a manner which allows the device to be backward compatible with systems which do not incorporate this feature and responsive to all-register read and write operations in systems which incorporate this feature.

Figure 3:
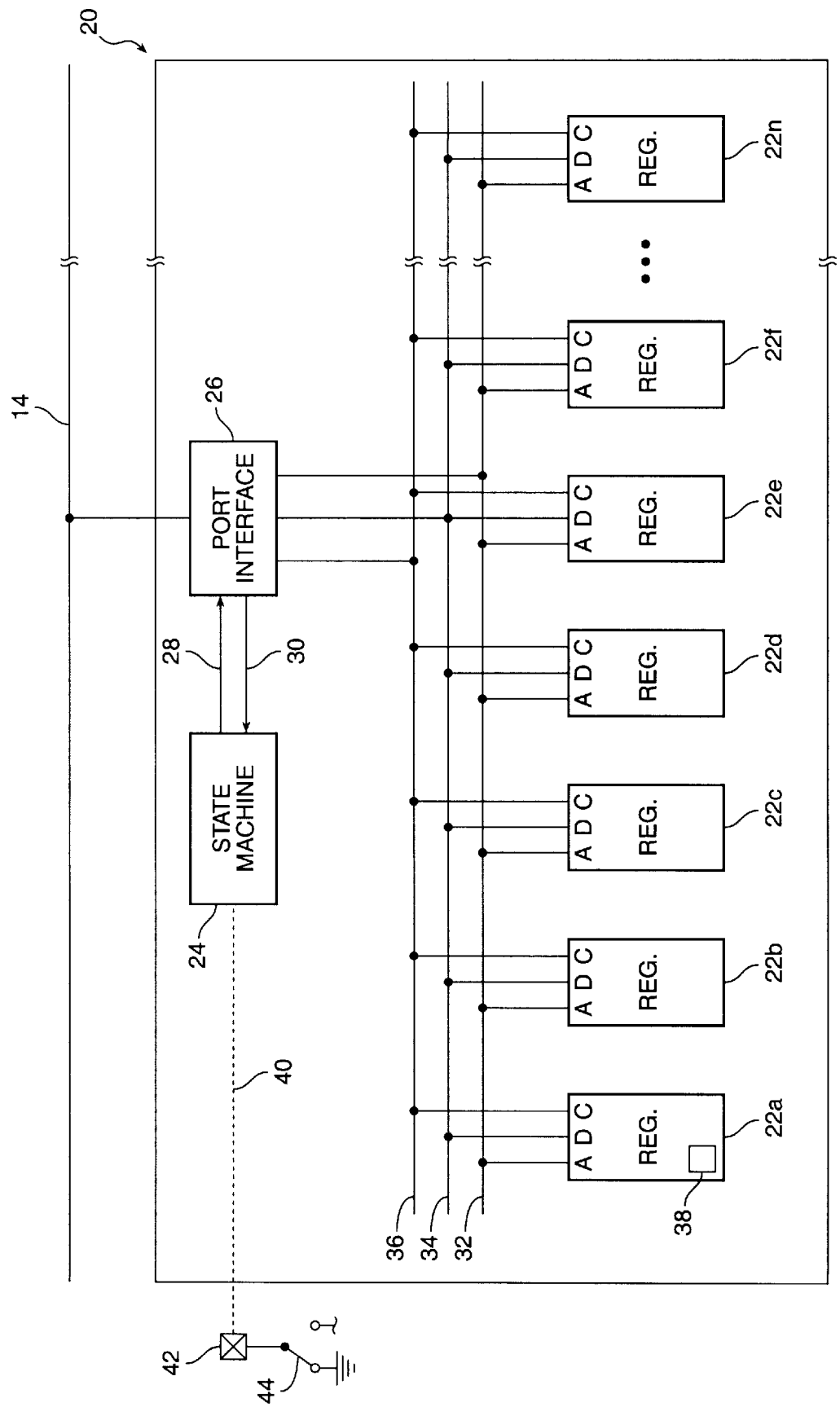
FIG. 3 is a block diagram of a multiple-register-access-capable device according to the present invention connected to a serial port.

Referring now to FIG. 3, a multiple-register-access-capable device 20 according to the present invention is shown in block-diagram form. The multiple-register-access-capable device 20 of FIG. 3 communicates with the serial data link 14 and with other devices as shown in the architecture of FIG. 1

The multiple-register-access-capable device 20 contains a plurality of registers 22a, 22b, 22c, 22d, 22e, 22f, and 22n. While the FIG. 3 depicts seven registers, those of ordinary skill in the art will recognize that this number is a matter of design choice as indicated by the breaks in the structure to the right of register 22f. For example, if the aforementioned IEEE protocol is used, there are a maximum of thirty-two registers, requiring a five-bit address field.

A state machine 24 controls the flow of data between the serial link 14 and the multiple-register-access-capable device 20. As will be readily comprehended by persons of ordinary skill in the art, state machine 20 may be readily implemented in hardware or software. Individual designs will depend on the particular serial link protocol used and will be simple design exercises given a defined protocol to implement. When used in the specification and claims herein, the phrase "state machine" is meant to include all hardware and software schemes known to those of ordinary skill in the art for controlling data flow in read and write operations between registers and a serial port.

The flow of data is directly controlled by port interface 26, which communicates with state machine 24 via control lines 28 and 30, which may each comprise one or more lines depending on the degree of control sought. Port interface 26 is the bridge between serial link 14 and the registers 22a, 22b, 22c, 22d, 22e, 22f, and 22n and will contain the necessary conventional bus switching and driving circuitry to interface between the serial link 14 and the register address, data, and control busses 32, 34, and 36, respectively.

The multiple-register-access-capable device 20 is configured to accept information indicating a multiple-register-access mode. When in this mode, device 20 interprets a read or write request identifying a preselected one of the registers 22a, 22b, 22c, 22d, 22e, 22f, and 22n as a read or write request for a preselected group of the registers 22a, 22b, 22c, 22d, 22e, 22f, and 22n. When a Controller addresses this register by asserting a frame identifying this register in a selected multiple-register-access-capable device 20 configured according to the present invention, the Controller is given access to a set of registers which may include all or less than all of the registers if the multiple-register-access-capable mode of the present invention has been enabled. Those of ordinary skill in the art will readily understand how to configure the state machine in any particular embodiment of the invention to select any number of particular registers to operate according to the disclosure.

Enablement of the multiple-register-access-capable mode of the present invention can be accomplished in numerous ways, for example, by setting one of the bits in a register to a defined logic state, a pin on the integrated circuit, a mechanical switch, etc. In an embodiment where a bit is set in one of the registers (illustrated in FIG. 3 by a square 38 representing the enable bit in register 22a), the state machine 24 interrogates the designated bit position and controls operation of the device 20 in accordance with the contents of the designated bit position in the register.

As an illustrative example, in an embodiment where register bit 38 in register 22a is set, a "one" in the designated bit position could be defined to enable the multiple-register-access-capable mode of the present invention and a "zero" in the designated bit position would define a single register access mode.

As a further illustration, indicated in dashed lines on FIG. 3, a line 40 from state machine 24 is connected to I/O pad 42 of the integrated circuit containing device 20. I/O pad 42 may be grounded or connected to the positive supply rail either by hardwiring or by a switch (shown at reference numeral 44). Other methods of enablement are possible either through software or hardware and will readily suggest themselves to persons of ordinary skill in the art.

In the illustrative embodiment of the invention disclosed herein, register address thirty one is designated as the multiple register access mode register, although those of ordinary skill in the art will recognize that one of the other registers could be so designated. When the Controller addresses register thirty one, the device 20 provides access to a set of registers selected by the state machine 26. This set may include all of the registers including register address thirty one, it may include all registers except register thirty-one, or it may include some other preselected number of registers.

Figures 4, 5:
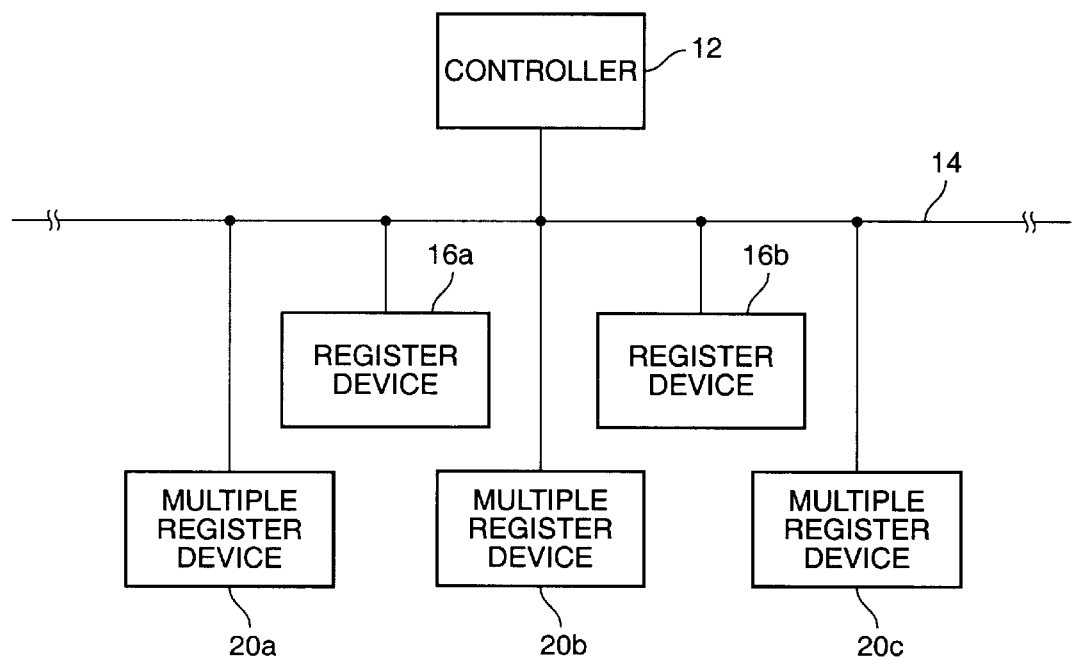
FIG. 4 is a bit map of typical read and write packets addressed to a device such as the one in FIG. 3.
FIG. 5 is a block diagram of a system including a plurality of register-based serial port devices in accordance with the present invention connected to a serial port.

Multiple register access is accomplished by modifying the DATA field in the packet frame structure. For example, consider how the packet frame structure of the IEEE protocol shown in FIG. 2 is modified to function in accordance With the teachings of the present invention. FIG. 4 is a bit map of typical read and write packets addressed to a device such as the one in FIG. 3 and shows how the packet frame structure of the IEEE protocol shown in FIG. 2 could be modified to accommodate the multiple-register-access mode of the present invention, assuming that all thirty-two registers are accessed in a multiple register access cycle.

As may be seen from an examination of FIG. 4, when in the multiple register access mode, rather than the sixteen bits D0 through D15 that usually make up the DATA field, the DATA field is expanded to 512 bits D0 through D511. The 512 bits contained in a multiple register access DATA field are a collection of the sixteen bits from each of the thirty two registers of the Physical Device (32×16=512). The result is a multiple register access MI frame of 528 bits (16+512= 528). The remaining sixteen bits contained in the other MI frame fields stay the same.

The presently preferred order of the bits in the multiple register access DATA field consists of the bits from each register taken in sequential order from register address zero to register address thirty one. One of ordinary skill in the art will realize that there are any number of other possible orders for the bits in all fields that remain within the inventive concepts set forth herein.

A comparison between the prior art and the presently disclosed invention demonstrates the advantage of the multiple register access apparatus and methods disclosed herein. The time required to access any one register, other than the multiple register access mode register, is still sixty four clock cycles in the Physical Device. However, governed by the present invention, the time required to access all thirty two of the registers of the Physical Device is improved through the use of the multiple register access MI frame.

The time required to access all thirty two of the registers of the Physical Device is improved from 2048 clock cycles in the prior art to only 560 clock cycles in the present invention. The total of 560 cycles is the sum of the thirty two cycles to establish the idle state of the Physical Device and the Controller and the 528 cycles of the multiple register access MI frame.

One of ordinary skill in the art will recognize that a time savings would be realized by the generalized use of this method in any case where more than one register needs to be accessed via a serial port. The access of all thirty two registers of the Physical Device by the Controller as disclosed herein is presented as the worst case scenario in the Fast Ethernet application.

One or more multiple-register-access-capable devices 20 according to the present invention may easily be integrated into a communications system which employs a serial link, such as the one depicted in FIG. 1. FIG. 5 is a block diagram of such a system including a plurality of register-based serial port devices in accordance with the present invention connected to a serial port. As may be seen from FIG. 5, a serial link 14 may be driven by Controller 12. A plurality of multiple-register-access-capable devices 20a through 20c are shown connected to the serial link 14, as well as a plurality of prior art Physical Devices 16a and 16b.

FIG. 5 illustrates that it is possible to configure a system in which some multiple-register-access-capable devices may be employed along with other register-based Physical Devices which do not have the features of the present invention. As will be appreciated by those of ordinary skill in the art, addressing the devices 16a and 16b and 20a through 20c is the same except that devices 16a and 16b and devices 20a through 20c will respond differently to multiple-register-access mode commands addressed to the designated register. Devices 16a and 16b will merely operate on the register actually addressed, whereas devices 20a through 20c will respond according to the teachings of the present invention.

Figure 6:
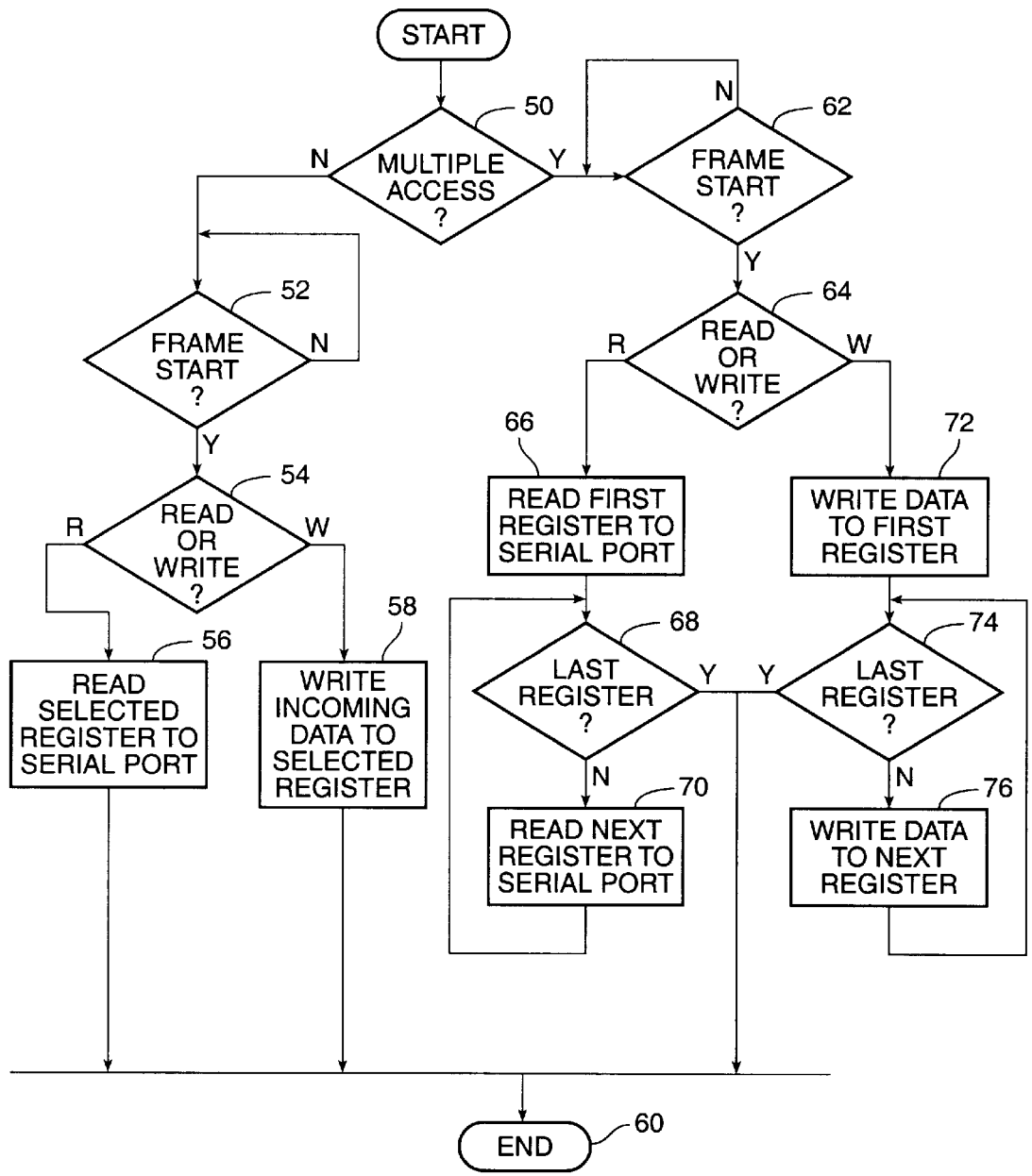
FIG. 6 is a flow diagram illustrating a presently preferred embodiment of the method of the present invention.

Referring now to FIG. 6, a flow diagram illustrating a presently preferred embodiment of the method for multiple register access of a register based serial port device according to the present invention is presented. First, at step 50, the state machine determines if it is in multiple-register access mode by examining the multiple-register-access enable indicator which, as previously mentioned, may take one of a number of forms. The process flow will take two different paths, depending on whether multiple-register access mode is enabled.

If multiple-register-access mode is not enabled, the process proceeds to decision diamond 52, where it awaits the start of an information frame. When a frame is received, decision diamond 54 examines the frame OP code and determines whether it is a read frame or a write frame. If it is a read frame, at step 56 the data are read from the selected register, placed in a frame and sent out over the serial link. If it is a write frame, the incoming data are written to the selected register in step 58. Such read and write operations are well known in the art and will not be set forth in detail herein. After the read or write operation is finished, the process ends at step 60.

If multiple-register-access mode has been enabled, the process proceeds to decision diamond 62, where it awaits the start of an information frame. This process step may be the same as step 52.

When a frame is received, step 64 examines the frame OP code and determines if it is a read frame or a write frame. Step 64 may be the same as step 54. If the frame is a read frame, step 66 reads the data from the first register in the group of registers designated in the multiple register access mode, placed in a frame and sent out over the serial port. Step 68 determines if the register just read was the last one in the group. If it was, the process ends at step 60. If it was not, step 70 reads the data from the next register in the group of registers designated in the multiple register access mode, placed in a frame and sent out over the serial port. Step 68 then again determines if the register just read was the last one in the group. Steps 68 and 70 are repeated until all registers in the group have been read.

If the frame is a write frame, step 72 writes the first data byte to the first register in the group of registers designated in the multiple register access mode. Step 74 determines if the register just written to was the last one in the group. If it was, the process ends at step 60. If it was not, step 76 writes the next data byte to the next register in the group of registers designated in the multiple register access mode. Step 74 again determines if the register just written to was the last one in the group. Steps 76 and 74 are repeated until data have been written to all registers in the group.

Persons of ordinary skill in the art will recognize that the process flow set forth in FIG. 6 is illustrative and that minor modifications in the order of some of the steps are possible without departing from the concept of the present invention.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A program storage device readable by a machine, tangibly embodying a program of instructions executable by the machine to perform a method for operating a multiple-register-access-capable device, the method including:

providing a plurality of registers communicating with an address bus and a data bus, one of said plurality of registers being a selected register;

providing a serial port communicating with said address bus and said data bus;

providing a multiple-register-access enable indicator responsive to a multiple-register-access enable signal from said serial port, said multiple-register access-enable indicator having a first state indicating single-register access and a second state indicating multiple-register-access;

providing a state machine for controlling data flow into and out of said plurality of registers in accordance with information packets received through said serial port;

operating said state machine to perform a read or write operation on a single one of said plurality of registers in response to one of said information packets identifying said single one of said registers and specifying a read or write operation when said multiple-register-access enable indicator is in said first state;

operating said state machine to perform a read or write operation on a selected group of said plurality of registers in response to one of said information packets when said multiple-register-access enable indicator is in said second state and said one of said information packets identifies said selected register; and operating said state machine to perform a read or write operation on a single one of said plurality of registers in response to one of said information packets identifying said single one of said registers and specifying a read or write operation when said multiple-register-access enable indicator is in said second state.

2. The program storage device of claim 1, wherein the step of operating said state machine to perform a read or write operation on a selected group of said plurality of registers is performed on all of said registers.

3. The program storage device of claim 1, wherein the step of operating said state machine to perform a read or write operation on a selected group of said plurality of registers is performed on all of said registers except for said selected register.

4. A program storage device readable by a machine, tangibly embodying a program of instructions executable by the machine to perform a method for operating a multiple-register-access-capable device, the method including:

providing a plurality of registers communicating with an address bus and a data bus, one of said plurality of registers being a selected register;

providing a serial port communicating with said address bus and said data bus;

providing a state machine for controlling data flow into and out of said plurality of registers in accordance with information packets received through said serial port;

operating said state machine to perform a read or write operation to a selected group of said plurality of registers in response to one of said information packets when said one of said information packets identifies said selected register; and operating said state machine to perform a read or write operation to a single one of said plurality of registers in response to one of said information packets identifying said single one of said registers and specifying a read or write operation.

5. The program storage device of claim 4, wherein said selected group of said plurality of registers comprises all registers.

6. The program storage device of claim 4, wherein said selected group of said plurality of registers comprises all registers except for said selected register.

* * * * *